US010522920B2

(12) United States Patent
Arcidiacono et al.

(10) Patent No.: US 10,522,920 B2
(45) Date of Patent: Dec. 31, 2019

(54) METHOD OF GENERATING CIRCULARLY POLARISED SIGNALS FROM A POLARISATION CONTROLLER OF A GROUND STATION

(71) Applicant: EUTELSAT S A, Paris (FR)

(72) Inventors: Antonio Arcidiacono, Paris (FR); Daniele Vito Finocchiaro, Paris (FR); Alessandro Le Pera, Issy-les-Moulineaux (FR)

(73) Assignee: EUTELSAT S A, Paris (FR)

( * ) Notice: Subject to any disclaimer, the term of this patent is extended or adjusted under 35 U.S.C. 154(b) by 99 days.

(21) Appl. No.: 15/568,369

(22) PCT Filed: Apr. 22, 2016

(86) PCT No.: PCT/FR2016/050949
§ 371 (c)(1),
(2) Date: Oct. 20, 2017

(87) PCT Pub. No.: WO2016/170282
PCT Pub. Date: Oct. 27, 2016

(65) Prior Publication Data
US 2018/0109003 A1    Apr. 19, 2018

(30) Foreign Application Priority Data
Apr. 22, 2015 (FR) ..................... 15 53609

(51) Int. Cl.
H01Q 15/24    (2006.01)
H04B 7/185    (2006.01)
(Continued)

(52) U.S. Cl.
CPC .......... *H01Q 15/244* (2013.01); *H01Q 1/288* (2013.01); *H01Q 19/192* (2013.01); *H01Q 21/24* (2013.01);
(Continued)

(58) Field of Classification Search
CPC ...... H01Q 15/244; H01Q 21/24; H04Q 1/288; H04Q 15/244
(Continued)

(56) References Cited

U.S. PATENT DOCUMENTS

2002/0171596 A1    11/2002  Em et al.
2003/0203733 A1*   10/2003  Sharon ................... H01Q 1/288
                                                        455/427
2009/0061760 A1*    3/2009  Barak ................ H04B 7/18513
                                                        455/3.02

FOREIGN PATENT DOCUMENTS

FR    3 007 913 A1    1/2015

OTHER PUBLICATIONS

International Search Report as issued in International Patent Application No. PCT/FR2016/050949, dated Jul. 14, 2016.

* cited by examiner

*Primary Examiner* — John J Lee
(74) *Attorney, Agent, or Firm* — Pillsbury Winthrop Shaw Pittman LLP

(57) ABSTRACT

A method for generating a circular polarisation signal from at least two transponders of a satellite able to process linearly polarised signals includes: a transmission of at least two linearly polarised signal components so as to produce a circularly polarised signal by at least two transponders of a satellite; processing signals by the two transponders of the satellite to produce a circular polarisation of the signals transmitted by the satellite; ground receiving by at least one circularly polarised antenna; measuring a physical parameter from the received signals, and determining a correction parameter to be applied to the generation of the components of linearly polarised signals; generating a compensation of the components of linearly polarised signals transmitted to the satellite.

29 Claims, 4 Drawing Sheets

(51) Int. Cl.
*H01Q 1/28* (2006.01)
*H01Q 21/24* (2006.01)
*H01Q 19/19* (2006.01)
*H04H 20/74* (2008.01)

(52) U.S. Cl.
CPC ..... *H04B 7/18513* (2013.01); *H04B 7/18523* (2013.01); *H04B 7/18589* (2013.01); *H04H 20/74* (2013.01)

(58) Field of Classification Search
USPC ............... 455/427, 3.02, 430, 12.1, 13.3
See application file for complete search history.

METHOD OF GENERATING CIRCULARLY POLARISED SIGNALS FROM A POLARISATION CONTROLLER OF A GROUND STATION

CROSS-REFERENCE TO RELATED APPLICATIONS

This is the U.S. National Stage of PCT/FR2016/050949, filed Apr. 22, 2016, which in turn claims priority to French Patent Application No. 1553609, filed Apr. 22, 2015, the entire contents of all applications are incorporated herein by reference in their entireties.

FIELD

The field of the invention relates to methods enabling circularly polarised signals to be generated from a satellite including linear polarisation transponders configured to process linearly polarised signals. The field relates more specifically to methods enabling signals transmitted by a ground station to the satellite to be processed in order that they can be received by terminals with circularly polarised antennae.

STATE OF THE ART

Satellite means currently exist enabling circularly polarised signals to be transmitted from signals transmitted from Earth to the satellite, which themselves have circular polarisation.

However, there is an operational need to transmit circularly polarised signals to terminals with circularly polarised antennae from a satellite, despite the fact that this satellite has transponders which are initially configured to process linear polarisations. As is habitual, in this description a "transponder" includes a reception antenna and a transmission antenna. Consequently the polarisation given by the antenna indicates a polarisation configuration for a transponder.

For example, applications for mobile terminals require the signal to be circularly polarised to optimise reception quality, despite the fact that the satellite uses linear transponders. Linear transponders were initially deployed for stationary applications.

Another example is the deployment of a service to terminals which already have circular polarisation, using a satellite designed for other terminals.

One problem derives from the fact that it is impossible to change the configuration of the transponders when the satellites are in orbit. It is also costly to put new satellites, with circular polarisation transponders, into orbit. A desired solution would be to use the existing satellites with linear polarisation transponders to generate signals which are coupled at the output of the satellite's antenna to generate a circular polarisation signal.

Coupling the signals of two transponders also enables the output power (EIRP) of the signal transmitted to the terminals to be combined. Indeed, the combined signal may have twice the power (+3 dB) compared to a signal transmitted by a single transponder, and this can improve reception quality, especially in cases of mobile applications with small antennae.

Patent application US 2009/0061760 provides a solution enabling a signal to be generated with circular polarisation, from signals transmitted from Earth with linear polarisation, which are retransmitted to terminals from the satellite with linear polarisation. This application covers the possibility of using two transponders sharing a common band to create between the signals polarised linearly in this band a signal with circular polarisation at the antenna output.

This patent application addresses in particular a problem relating to the oscillators of each transponder causing frequency and phase errors in each linear component, each of which passes through a transponder.

One disadvantage of the solution described in this patent application is that it does not take into account the undesirable effects of signals which are combined in order to be circularly polarised in a common band of two transponders when the signal spectrum spreads beyond the common band of the two transponders.

SUMMARY OF THE INVENTION

The invention enables the above-mentioned disadvantages to be resolved.

One object of the invention relates to a method for generating a signal with a second type of polarisation from at least two transponders of a satellite (SAT) which are modified to process signals polarised with a first type of polarisation, where the method includes:

Transmission by a ground transmitter (ANT1) of at least two signal components (VP1, HP1) polarised with the first type of polarisation, and phase-shifted so as to produce a signal polarised with the second type of polarisation by at least two transponders of a satellite (SAT), where the at least two transponders (T1, T2) have channels with frequencies sharing between them at least one common spectral band (C1), including at least a portion of the spectrum of the transmitted signals;

Processing of the signals (HP1, VP1) by the at least two transponders (T1, T2) of the satellite (SAT), where the components of the signals (HP1, VP1) are combined after their transmission by the satellite (SAT) to form a signal with a polarisation of the second type (SAT);

Reception by a reference ground terminal having at least one antenna polarised with the first or second type of polarisation, so as to receive the signals transmitted by the satellite;

Measurement of at least one physical parameter from the received signals, and determination of a correction parameter to be applied to the generation of the components of signals polarised with the first type of polarisation;

Generation of a phase and/or amplitude and/or frequency compensation of the components of the signals polarised with the first type of polarisation transmitted by the ground transmitter, where the said compensation is generated by the polarisation controller so as to form a looped system between the ground transmitter and the satellite, and to provide polarisation of the second type by the components being combined after their transmission by the satellite.

According to one embodiment, the measurement of at least one first physical parameter and the determination of a first correction parameter to be applied to the generation of the components of signals polarised with the first type of polarisation is made by analysing the main signal received.

According to one embodiment, the measurement of at least one second physical parameter and the determination of a second correction parameter to be applied to the generation of the components of signals polarised with the first type of polarisation is made by analysing the pilot signal received and by measuring its main characteristics, such as its amplitude, frequency and phase.

A correction and a compensation may be applied to each of the components of the signals polarised with the first type of polarisation transmitted by the ground transmitter signals by considering the first and the second corrections.

According to one embodiment, the first type of polarisation is a linear polarisation, and the second type of polarisation is a circular polarisation.

According to one embodiment, the first type of polarisation is a circular polarisation, and the second type of polarisation is a linear polarisation.

One advantage of the invention is that it mitigates the processing of the signals in the transponders which modify the polarisations of the components transmitted by the satellites. Indeed, by introducing a corrective parameter through the polarisation controller, the signals are combined at the output of the satellite so as to produce a signal with a desired linear polarisation or a desired circular polarisation, depending on the envisaged embodiment.

One advantage is that better reception of the signals on the ground is obtained by receivers with a given polarisation.

According to one embodiment, the polarisation controller generates two orthogonal linear components from a main signal received at the input of the said polarisation controller, where a first component generates a horizontal polarisation component from the main signal, and a second component generates a vertical polarisation component from the main signal, and where at least one linear polarisation component is compensated in terms of amplitude and/or phase and/or frequency.

According to one embodiment, the polarisation controller generates two linear components from two main signals received at the input of the said polarisation controller, where a first signal has, at the output from satellite SAT, a left-handed circular polarisation, and a second signal has, at output from satellite SAT, a right-handed circular polarisation, where the polarisation controller generates a component of the horizontal polarisation signal and a component of the vertical polarisation signal from the two main signals at the inputs, and where at least one linear polarisation component is compensated in terms of amplitude and/or phase and/or frequency.

In a comparable manner, according to another embodiment, the polarisation controller generates two circular components from one or two signals, as applicable. The two components then generate two right-handed and left-handed circular components from the main signal. The compensations in terms of amplitudes and/or frequencies and/or phases are then made in at least one of the circular components.

According to one embodiment, two sets of transponders are each associated with a given linear polarisation, where a polarisation of a transponder of a first set is orthogonal to the linear polarisation of a transponder of the second set, and where each transponder of the first set shares at least one common spectral band with a transponder of the second set.

Advantageously, both linear components transmitted by the ground transmitter each include at least one frequency spectrum in the spectral band common to at least two transponders of the satellite.

According to one embodiment, at least one first transponder of the first set shares at least one common spectral band with two other transponders of the second set, where the two other transponders have a polarisation orthogonal to the first transponder, and where the said common spectral band includes two spectral sub-bands.

In a comparable manner, according to another embodiment, both sets of transponders can be associated with mutually orthogonal circular polarisations.

According to one embodiment, the step of generating a phase and/or amplitude and/or frequency compensation of the linearly polarised signals by the polarisation controller is configured so as to reduce the effects on at least one linear component, where the said effects are related to the presence of at least one spectrum of a signal transmitted by the first transponder in a band outside the common band of two transponders, in which common band the said at least one linear component is transmitted.

According to one embodiment, the reduction of influence is calibrated to obtain a signal with circular polarisation formed by two linear polarisations of components sharing a common band of two transponders, respectively of the first and of the second set of transponders.

According to one embodiment the method includes a step of filtering of each linearly polarised component in the common portions of spectra shared between, respectively, two transponders of each of the two sets of transponders.

According to one embodiment, filtering is accomplished on the ground before transmission of the linearly polarised components. According to another embodiment, filtering is accomplished by the transponders before transmission of the components by the satellite's transmission antenna.

According to a variant embodiment, when the first polarisation is circular and the second polarisation is linear, the step of generation of a phase and/or amplitude and/or frequency compensation is applied to the circularly polarised signals to correct at the output of the transponders the linear polarisations which are formed when the signals are transmitted.

In this case the reduction of influence is calibrated to obtain a signal with linear polarisation formed by two circular polarisations of components sharing a common band of two transponders, respectively of the first and of the second set of transponders.

When it is accomplished this filtering step is suitable for circular polarisation in this second case.

According to one embodiment, a pilot signal is transmitted by the ground transmitter, where the said pilot signal includes at least one linear or circular polarisation component forming either a continuous wave, or a sequence spread across the spectrum, called a spread spectrum sequence.

The use of the pilot signal enables a calculation to made of the corrective parameters to be applied on the ground during transmission to the components of the signal to be transmitted, without modifying the transmitted signals themselves.

According to one embodiment, the pilot signal includes two linear polarisation components, where both linearly polarised components are transmitted in the common spectrum of two transponders belonging respectively to each of the two sets of transponders.

According to one embodiment, a linear polarisation component of the pilot signal is transmitted in a band of frequencies of a transponder of the first set of transponders not shared with a frequency band of a transponder of the second set of transponders.

According to another case, when the first type of polarisation is circular the pilot signal can then consist of approximately circular different components. The latter are transmitted in the common spectrum of two transponders belonging respectively to each of the two sets of transponders. According to a variant, at least one circular component of the pilot signal is transmitted in a frequency band of a transponder of the first set of transponders not shared with a frequency band of a transponder of the second set of transponders.

According to one embodiment, the step of processing the signals by the at least two transponders includes application of a coefficient of amplification, and a filtering template to each linearly or circularly polarised component of a common band of two transponders, so as to produce signals with polarisation at the antenna output which are:
circular in a given direction or;
linear in a given direction (depending on the envisaged case).

According to one embodiment, ground reception by the reference terminal of each circular or linear polarisation component is accomplished simultaneously by as many necessary antennae as required, configured according to the generated circular polarisations, or according to the generated linear polarisations.

According to one embodiment, ground reception by the reference terminal includes reception of two circular or linear polarisation components with, depending on the envisaged case:
either, respectively, a left-handed circular polarisation and a right-handed circular polarisation;
or, respectively, a vertical linear polarisation and a horizontal polarisation.

According to one embodiment, a measurement of a physical parameter includes a measurement of the cross-polarisation, between the two components of the signals received by means of the polarisation controller, where the correction parameter is automatically calculated to be applied to the generation of the linearly polarised signals transmitted to the satellite.

According to a variant embodiment, when the first type of polarisation is circular the correction parameter is automatically calculated to be applied to the generation of the circularly polarised signals and transmitted to the satellite. The signals are combined when they are transmitted to the satellite approximately linearly. The introduced corrective parameters may introduced bias when the polarisation components are combined. The combination is then partially linear or approximately linear due to the influence of the corrective parameters on one and/or other circular component.

According to one embodiment, a measurement of a physical parameter includes a measurement of the difference of the group propagation times of each of the polarisation components of the received signals.

According to one embodiment, a measurement of a physical parameter includes a measurement of an influence in terms of amplitude and/or phase of a spectrum of a signal transmitted in a transponder outside the common band of two transponders in a linear component of a pilot signal transmitted in the common band of the two transponders.

According to a variant embodiment, when the first type of polarisation is circular and the second type is linear the measurement of influence is made in relation to a circular component of a pilot signal transmitted in the common band of the two transponders.

According to one embodiment, the determination of the correction parameter includes an evaluation of a first phase variation parameter, and/or of a second amplitude variation parameter, and/or of a third frequency variation parameter, of the signals received by the reference terminal between the at least two transponders, deduced from the measurement of the at least one physical parameter.

According to one embodiment, the measurements of at least one received parameter are made from the reception of at least one component of a pilot signal.

According to one embodiment, the measurements of at least one received parameter are made from the received signals including at least the components of the main signal.

According to one embodiment, when at least one transponder of the first set shares at least one common spectral band with two transponders of the second set, where the said common spectral band includes two spectral sub-bands, the polarisation controller includes a configuration of the operational transponders of the satellite, such that there is a simulation of the interactions of at least one component of a signal received in a sub-band of a transponder in a component of a signal received in another sub-band of the same transponder common to another transponder to generate a correction parameter to be applied to the linear or circular component (depending on the mode used) of the signal transmitted in the common band.

According to one embodiment, the interactions include the influence of a signal of a sub-band on the power level of another signal transmitted in another sub-band in the same transponder.

According to one embodiment, the interactions include the influence of a signal of a sub-band on the phase of another signal transmitted in another sub-band in the same transponder.

According to one embodiment, a calculator of the polarisation controller makes a comparison between each linear polarisation component of the main signal transmitted to the satellite with the respective linear components deduced from the circular components received by the reference terminal, where the transmitted linear polarisation components of the main signal are recorded in a memory of the polarisation controller.

When the first type of polarisation is a circular polarisation, and the second type of polarisation is linear, the step of comparison is made on the circular components of the main signal. These components are deduced from the linear components received by the reference terminal.

According to one embodiment, the reference terminal and the polarisation controller are:
Either both sited in the same geographical location;
Or sited in two different positions, with the measurements and/or analyses made by the reference terminal then being sent to the polarisation controller by a communication means.

According to one embodiment, when the reference terminal and the polarisation controller are sited in two different positions, a phase compensation value is calculated taking into account the radiation diagram of the satellite's transmission antenna so as to generate, from the parameters of the signals received by the reference terminal, the compensations to be made to the signals transmitted to the satellite to optimise the circular polarisation quality, or linear polarisation quality, depending on the envisaged mode, in the region where the terminals are located.

According to one embodiment, the polarisation controller includes the reference terminal.

According to one embodiment, the processing of the signals by each transponder includes:
reception of the signals by antennae polarised with the first polarisation;
at least one transposition of the frequencies of the said received signals;
amplification of the said received signals;

transmission of the signals processed by the transponders by at least one transmission antenna of the satellite polarised with the first polarisation.

Another object of the invention relates to a device to correct polarisation of signal components, where the said correction device includes a polarisation controller including calculation means and a memory to apply corrective parameters to linear or circular signal components, where the said corrective parameters are estimated to mitigate processing of the said signals passing through at least two transponders of a satellite, and where the applied corrections enable a signal to be generated with circular or linear polarisation when the signals are combined at the output of the transponders.

The correction device also advantageously includes means to implement the method of the invention. In particular, the correction device includes signal processing means to correct the amplitude, phase or frequency of signals. It also includes means to process the signals with a given polarisation, circular, approximately circular or linear.

The correction device advantageously includes means to generate a pilot signal and/or means to process the signals transmitted from a generator to which it is coupled.

According to one embodiment, the correction device is the polarisation controller.

BRIEF DESCRIPTION OF THE FIGURES

Other characteristics and advantages of the invention will be seen clearly on reading the detailed description below, with reference to the appended figures, which illustrate.

DESCRIPTION

In the following description a ground station is a station which includes at least one transmission or reception antenna to communicate with a satellite in orbit. In the remainder of the description the ground station and its transmission or reception antenna are both given the same designation ANT 1. ANT 1 may refer to the first ground station, or the transmission antenna of this station. In the same way, ANT 2 designates the reception antenna of the second ground station, or alternatively the station itself.

The invention includes two principal embodiments. A first principal embodiment corresponds to the processing by a polarisation controller of signals with linear components so as to produce a signal with circular polarisation at the output of the transponders of a satellite when the components are combined after being transmitted. A detailed example is described this first principal embodiment in the remainder of the description.

A second principal embodiment corresponds to the processing by the polarisation controller of signals with circular components so as to produce a signal with linear polarisation at the output of the transponders when the signals are combined after being transmitted.

The present detailed description describes the first principal embodiment when the first type of polarisation is a linear polarisation, and the second type of polarisation is a circular polarisation.

The invention also relates to the second principal embodiment. In the latter case the corrective parameters are applied to the circular components in the polarisation controller. The transponders are configured to process circular polarisations forming approximately linear polarisations when they share a common band. In this case, at the output of the transponders, the circular signal components are combined to form a signal with linear polarisation at their transmission.

Figure 1:
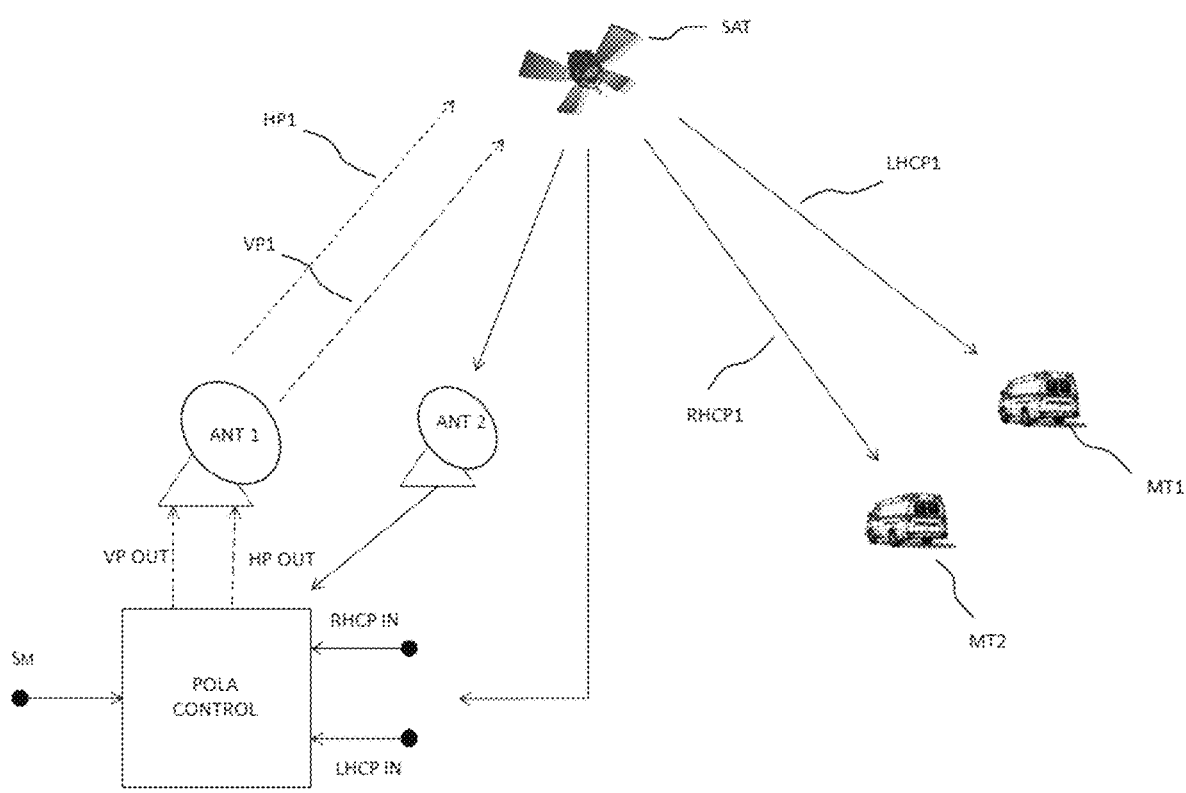
FIG. 1: a general outline diagram representing the different elements enabling the invention to be implemented.

FIG. 1 represents a general diagram of the elements of a system used to implement the method of the invention.

Among the elements of the system implementing the method of the invention are:

A first ground station including an antenna ANT 1 which transmits linear polarisation signals to a satellite SAT;

A satellite SAT including transponders to process the received signals in order to re-transmit them with circular polarisation to mobiles on the ground, noted MT1, MT2.

Mobiles on the ground, noted MT1, MT2, which are configured to receive circularly polarised signals;

A ground station including a reception antenna ANT 2 configured to receive circularly or linearly polarised signals;

A polarisation controller, which is a component, noted POLA CONTROL in FIG. 1. This component can be positioned at first ground station ANT1 or second ground station ANT2.

The method of the invention enables a looped system to be produced in the communications between the two ground stations ANT1 and ANT2 and satellite SAT. By virtue of this looped system, polarisation controller POLA CONTROL determines corrective factors to be applied to the linear components of the signals transmitted by first ground station ANT 1. The corrective factors are determined from measurements or calculations of physical parameters of the signals received by second ground station ANT2 from satellite SAT. The corrective factors are established in order that the signals have circular polarisation at the output of satellite SAT. The corrective parameters are, in particular, calculated and applied to the linear components to mitigate the imperfections of the transmission channels of each transponder.

The circularly polarised signals can then be received by mobile stations MT1, MT2, which are configured to receive circularly polarised signals.

Linear components HP1 and VP1 of the signals transmitted by the first ground station ANT 1 to satellite SAT are designated. According to one embodiment, one component is preferentially vertically polarised VP1, and a second component HP1 is preferentially horizontally polarised. However, these components can be corrected in terms of amplitude, phase or frequency by the corrective factors calculated by the method of the invention. The linear components are corrected and transmitted by first ground station ANT1 such that, after processing by the transponders of satellite SAT, a circular polarisation of the signals is generated.

The respectively "left-handed" and "right-handed" circular polarisations generated by satellite SAT are noted LHCP1 or RHCP1. According to a first embodiment, a single circular polarisation is generated. The other component can then be used on reception to calculate a physical parameter of variation of phase, amplitude or frequency between the two linear components, and to deduce from them, for example, a cross-modulation parameter.

Transmission Polarisation Controller

Transmitter Module/Receiver Module

The polarisation controller, noted POLA CONTROL, includes at least:
- a receiver module enabling the two circular or linear polarisation components received by the second ground station ANT2 to be received;
- a calculator enabling operations to be performed on the signals received to determine physical parameters of the signals relative to their polarisation, and corrective parameters to be extracted from them to be applied to the linear components VP1, HP1, to be transmitted to satellite SAT by first ground station ANT1;
- a transmitter module enabling corrected linear components, noted HP OUT and VP OUT, to be transmitted to the first ground station for transmission to satellite SAT.

The transmitter module and the receiver module of polarisation controller POLA CONTROL can be located in the same site, or be located in different geographical positions. The second configuration can be necessary when the satellite's uplink and downlink are different. In the embodiment in which they are located separately, a communication link is established either by land means or by satellite means. This link is used to transmit to the calculator of polarisation controller POLA CONTROL the data relative to the reception of the signals. In the latter case, the calculator of polarisation controller POLA CONTROL can introduce a corrective parameter specific to this transmission taking into consideration the delay or jitter of the signals through this link.

Radio Interface

According to one embodiment, polarisation controller POLA CONTROL includes a radio interface with a radio module GEN transmitting a signal $S_M$; this signal is also called the main signal. According to one embodiment, signal $S_M$ is a useful signal transmitted by an operator and must be broadcast by the satellite with a coverage specific to a plurality of receivers.

Polarisation controller POLA CONTROL is able, in this embodiment, to deduce two linearly polarised components HP1 and VP1 from input signal $S_M$. Components HP1 and VP1 are amplified and transmitted to satellite SAT. At the output of the satellite, the combination of the two components transmitted by the satellite form signal $S_M$ with LHCP (or RHCP) circular polarisation, which can therefore be received by the terminals with a circular polarisation antenna.

According to another embodiment, two main modulated signals are transmitted to polarisation controller POLA CONTROL. From the two signals the latter generates the two linearly polarised linear components which will be transmitted to the satellite. The two linear components are generated such that, at output from the satellite, the two main signals each have a circular polarisation (for example, the first main signal is with RHCP polarisation, and the second is with LHCP polarisation).

In this latter case, each component can be corrected from corrective parameters according to the method of the invention, such that the non-linear effects induced by the transponders are compensated.

Pilot Signal

Signal generator GEN includes a module enabling a pilot signal $S_P$ in transmission band $B_S$ to be modulated. According to another embodiment this function can also be provided by polarisation controller POLA CONTROL. Pilot signal $S_P$ can be a simple continuous frequency CW introduced into band $B_S$, or alternatively a pseudo-random sequence PN spread across the spectrum in band $B_S$ to prevent any interference with main signal $S_M$. When signal $S_P$ is generated by signal generator GEN, polarisation controller POLA CONTROL is able to detect the presence of the pilot signal, and to measure its main characteristics, such as its amplitude, frequency and phase.

Antenna Coupling

The transmitter module of polarisation controller POLA CONTROL is coupled to at least one antenna ANT1 to transmit each linear component of main signal $S_M$. According to one embodiment, antenna ANT1 may include a module enabling the signals to be filtered, and a signal amplifier. In the remainder of the description it is considered that the signals are transmitted in the band noted $B_S$.

Memory

Polarisation controller POLA CONTROL may include a memory enabling the following to be stored:
- data relative to the linear components generated towards antenna ANT1;
- physical parameters measured or calculated from the received signals;
- previously applied corrective parameters which are readjusted and recorded according to the calculated physical parameters;
- configuration parameters, inserted by an operator or transmitted by another system of the ground station, such as the characterisation of the transponders or the ephemerides of the satellite.

This data can be tallied, such that comparisons can be made between the circularly polarised signals received and the corrected linear polarised signals, in order to deduce differences between them, and to control the looped system.

The Satellite's Transponders

Satellite SAT includes a plurality of transponders noted T1, T2, . . . , TN. Each transponder includes:
- possibly, a filtering module;
- possibly, a module enabling the frequencies of the received signals to be transposed;
- an amplifier enabling the received signals to be amplified; and;
- a transmitter to re-transmit the signals to the ground receivers.

A reception antenna enables the signals received to be forwarded to the transponders when the reception antenna is common. According to another embodiment each transponder includes a reception antenna.

According to one embodiment, a mixer can be positioned at the output of the transponders to mix the signals which are to be transmitted.

Each transponder includes a specific frequency band enabling the received signals to be filtered and processed before being retransmitted.

Figure 3:
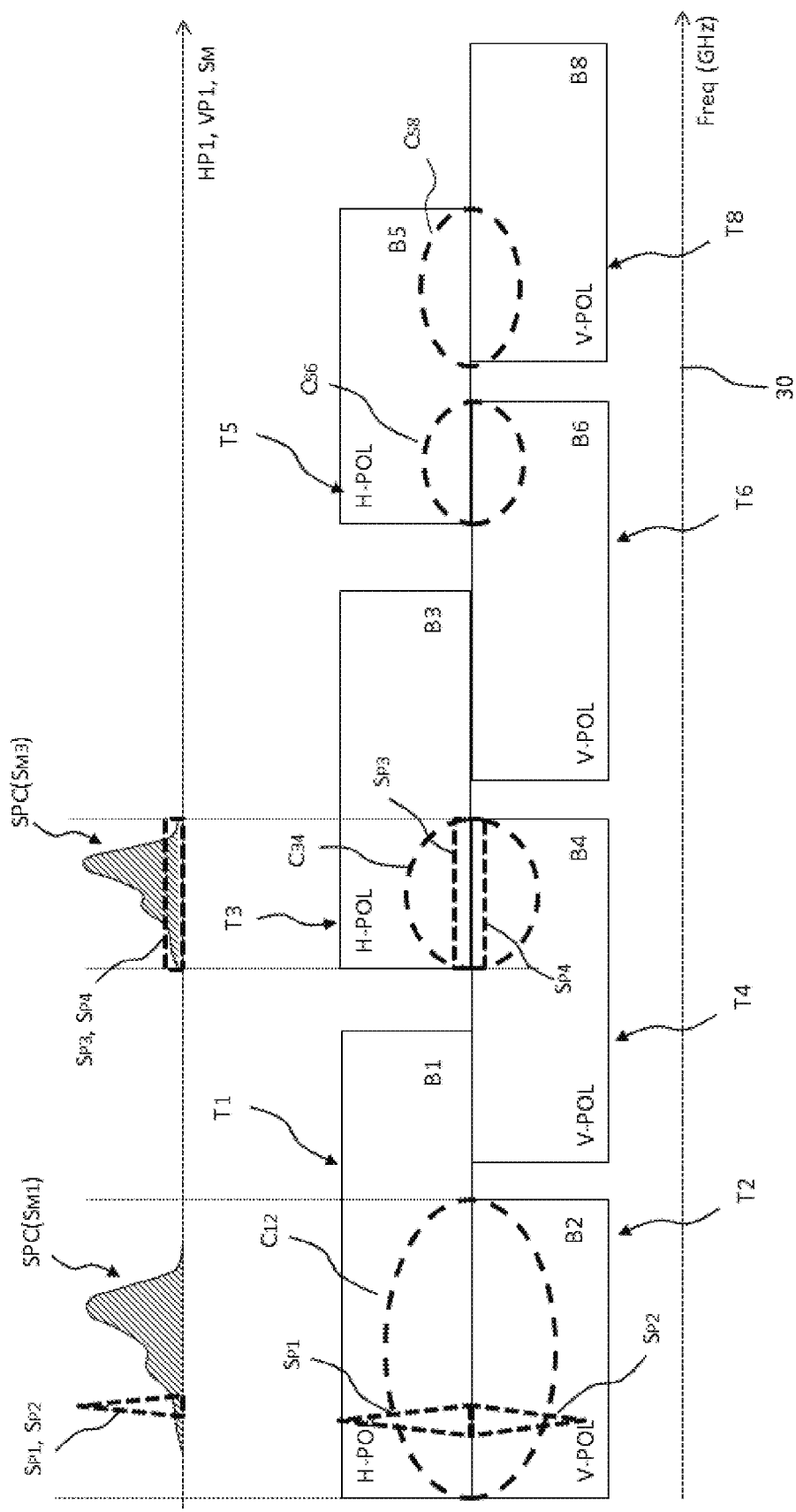
FIG. 3: a representation of channels of different linear transponders of a satellite and the bands shared between different transponders.
Figure 4:
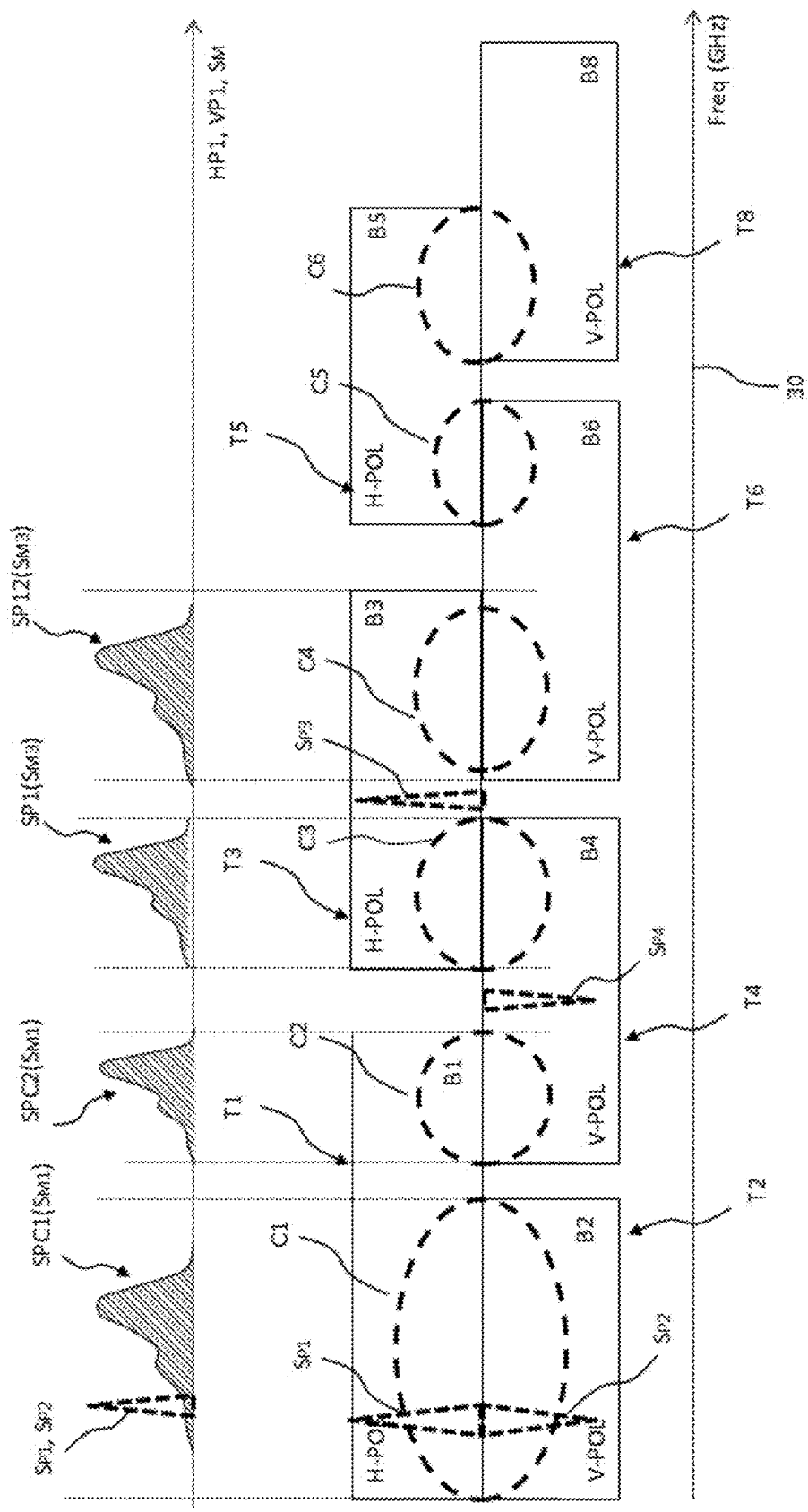
FIG. 4: a case in which a transponder has different sub-bands shared with two other transponders.

FIG. 3 represents an example embodiment including seven different transponders numbered as follows: T1, T2, T3, T4, T5, T6 and T8. Each transponder of satellite SAT has at least one band of frequencies noted respectively B1, B2, B3, B4, B5, B6 and B8. The transponders of satellite SAT are divided into two sets of transponders with orthogonal linear polarisations. For example, a first group of transponders T1, T3, T5, each of which has horizontal linear polarisation H-POL, and a second group of transponders T2, T4, T6, T8, each of which has vertical linear polarisation V-POL, are represented in FIGS. 3 and 4.

It is noted that, according to the international regulations, a transponder has a band and a reception polarisation, also called an upstream band $B_{mi, i\in[1, 8]}$ and an upstream polarisation or Uplink. The reception polarisation is imposed by the reception antenna. The latter includes the signal from the ground station. A transponder also includes a transmission band and a transmission polarisation, also called a downstream band $B_{di, i\in[1, 8]}$ and "downstream polarisation" or Downlink which includes the signal transmitted to the ground. The transmission polarisation is imposed by the transmission antenna.

Normally, both upstream band $B_{mi}$ and downstream band $B_{di}$ are separated by a constant quantity, and the upstream and downstream polarisations are reversed. In what follows, the upstream or downstream band of the transponder will therefore be indicated with the notations B1 to B8, interchangeably. The appropriate interpretation can be made from the context. The invention applies in other satellite architectures in which the upstream and downstream bands and polarisations are positioned differently.

In the remainder of the description it may be considered, for example, that common bands $C_{12}$, $C_{34}$, $C_{56}$, $C_{58}$ represented in FIG. 3 are the downstream common bands of the signals transmitted to the receivers from the satellite's transponders.

Two sets of transponders are represented on different lines, according to their polarisation. Abscissa 30 corresponds to the frequencies of the band of each transponder.

In one embodiment of the invention two transponders are considered, noted respectively T1 and T2, configured to receive signals according to linear polarisations in a band B1, respectively B2. According to one embodiment, the polarisations of the reception antennae of transponders T1 and T2 include respectively a horizontal polarisation and a vertical polarisation.

Frequency band $B_S$ of the signals transmitted by antenna ANT1 of the first ground station is included in at least one upstream band B1, B2 of one of the two transponders T1, T2. Different configurations can be envisaged depending on the embodiments of the invention. The different embodiments corresponding to the different configurations are described with regard to FIGS. 3 and 4.

According to a first configuration, linear components HP1, VP1 of transmitted signal $S_M$ have a spectrum SPC (SM) which is included in a common band $C_{12}$ of both bands B1, B2 of each transponder T1, T2 each receiving linear components HP1, VP1.

So as to form signal $S_M$ with a circular polarisation of both linear components HP1 and VP1, the latter are transmitted in common band $C_{12}$ of the two transponders T1, T2.

According to a second configuration, an additional signal, called pilot signal $S_p$, can be added to main signal $S_M$. Pilot signal $S_p$ can be a continuous frequency of the non-modulated "pure" carrier type, i.e. a CW, continuous wave. This pilot signal $S_p$ is represented in FIGS. 3 and 4 by signal $S_{P1}$ and $S_{P2}$ in the common band of the two transponders T1, T2. Both components $S_{P1}$ and $S_{P2}$ with linear polarisations are compensated according to the method of the invention to form signal $S_M$ with a circular polarisation in the common band of the transponders and at the output of satellite SAT. The term "compensated component" is understood to mean a component which is phase- and/or amplitude- and/or frequency-corrected. The two corrected linear components form a pair of linearly polarised orthogonal components so as to generate a circularly polarised component.

Alternatively, the two components $S_{P1}$ and $S_{P2}$ are not compensated, but measurement of their amplitude and/or of their phase and/or of their frequency enables the necessary parameters to be calculated to compensate for main signal $S_M$.

In this configuration, linear components $S_{P1}$ and $S_{P2}$ of pilot signal $S_P$ are transmitted at the margin of main spectrum $SPC(S_M)$ of the linear components of main signal $S_M$ so as to minimise the interference with the latter signal.

According to a third configuration, pilot signal $S_P$ is a spread spectrum signal in common band $B_{34}$ of two transponders like the two represented components $S_{P3}$ and $S_{P4}$ transmitted in bands B3 and B4 of transponders T3 and respectively T4. In the same way as previously, the two components $S_{P3}$ and $S_{P4}$ in common band $C_{34}$ are combined to form at least one circular polarisation at the output of the transmission antenna of satellite SAT.

According to a fourth configuration represented in FIG. 4, the two linear components HP1, VP1 of main signal $S_{M1}$ have a wider spectrum including a first sub-spectrum SPC1 $(S_{M1})$ and a second sub-spectrum $SPC2(S_{M1})$. This configuration enables a portion of spectrum SPC1 $(S_{M1})$ of main signal $S_{M1}$ to be transmitted in a common band $C_1$ of a first pair of transponders T1, T2 and another portion of spectrum $SPC2(S_{M1})$ of main signal $S_{M1}$ in a second common band $C_2$ of another pair of transponders T1, T4.

This configuration is appropriate when in a satellite a transponder T1 includes a first sub-band C1 and a second sub-band C2 of frequencies common with two other transponders T2 and T4.

One advantage of this configuration is that it increases the useful bandwidth to transmit the signals. It also enables the compensations to be calibrated according to the method of the invention to be made to the linear components to generate circular polarisations of signals passing through three different transponders T1, T2, T4.

An alternative to this configuration is to consider that the two spectra SPC1 and SPC2 are associated with different signals which do not originate from the same source, i.e. from the same ground station, and therefore originate from different polarisation controllers. This case can occur when a transponder is used by different operators sharing the offered frequency band. This means that the method of the invention applies if a portion of the spectrum will be corrected, taking into consideration the influence of the presence of another spectrum of a given transponder.

In the latter case, a suitable notation should use a differentiation of the signals: $SPC1(S_{M1})$ and $SPC2(S_{M2})$ to distinguish signals $S_{M1}$ and $S_{M2}$ originating from different sources, but for convenience of writing the two spectra SPC1 and SPC2 in the remainder of the description will be associated with signal $S_{M1}$. The invention applies if the two spectra SPC1 and SPC2 originate from the same source, or if the two spectra SPC1 and SPC2 originate from different sources.

With these two eventualities the method of the invention enables the mutual effects of the two non-linear spectra SPC1 and SPC2, the influences of the phase/amplitude ratio and amplitude/amplitude effects of both portions of spectrum SPC1 and SPC2 of the main spectrum SPC to be compensated/corrected.

Indeed, the portion of spectrum SPC1 introduces effects on the portion of spectrum SPC2 when the signals pass through a given transponder. The corrective parameters to generate a circular polarisation of the two linear components of spectrum SPC1 must thus take into account a compensation relating to the effects caused by spectrum SPC2 on the components of spectrum SPC1.

The method of the invention is, in particular, of great interest in taking into account corrective factors of the linear components intended to correct the effects caused by a spectrum outside a common band.

This is, for example, the case when a portion of the spectrum of B1 which is not in common band C1 introduces effects on the linearity of the polarisation of the signals of band C1 of B1.

According to a fifth configuration, represented in FIG. 4, a linear component of a pilot signal $S_{P4}$ or $S_{P3}$ can be transmitted outside a band of a transponder T3 and respectively T4 so as to measure the non-linearity effects of a transponder on a given linear component.

In this eventuality the linear component transmitted at the output of the satellite by a single transponder may be:

- either received on the ground by an antenna of a second linearly polarised ground station; in this case the linear component is compared to the component transmitted by first ground station ANT1 to satellite SAT to deduce from it the influence of the transponder on the component;
- or received by antennae which are circularly polarised in opposite directions to reconstruct the linear component and to deduce from it, by comparison, an effect produced by transponder T4, respectively T3, of satellite SAT.

The preceding configurations can also be combined by using, for example, a plurality of transponders so as to optimise the calculation of the compensations to be made to the linear components transmitted according to their spectral bands.

According to one example embodiment, a sequence of pilot signals with two phase states, such as, for example, a BPSK modulation, can be used. This sequence of signals can be used to determine the effects introduced by the two transponders T1, T2, with orthogonal linear polarisations. This therefore enables a calculation to be made of the compensations to be made to signal $S_M$ for the combination of the signals transmitted by T1, T2 to be with circular polarisation. These effects can be phase, time or amplitude differences of the signals processed by each of the transponders.

The sequence of pilot signals can then be used to identify the time differences introduced and caused by the two transponders T1, T2.

This sequence of signals also enables differences of amplitudes and phases introduced by the two transponders T1, T2 to be deduced.

The power of the pilot signals can be calibrated so as to reduce as far as possible the interferences with the main signals.

To this end, the pilot signals can also be a spread spectrum sequence, also called a spread spectrum signal, through the use of a PN pseudo-noise sequence, for example by using a "Gold Sequence". In this case, as described above in detail, a PN sequence can be used to encode a linear polarisation component.

Ground Reception, Second Station

A second ground station including an antenna ANT2 is used to receive the signals transmitted by satellite SAT. The signals transmitted by satellite SAT correspond to the linear components compensated by the method of the invention transmitted by first ground station ANT1. These corrected components are processed by transponders T1, T2, . . . , TN of satellite SAT, for example by filtering, a transposition of frequencies of the carrier, amplification of the signals, multiplexing, etc.

At the output of satellite SAT, due to the compensations introduced to mitigate the non-linear effects and the errors introduced by each transponder, the linear components transmitted at a given carrier frequency form a circular polarisation signal.

At the output of satellite SAT a multiplexer may enable a signal including different components to be generated.

According to one embodiment of the invention, second ground station ANT2 is advantageously a reference terminal REF TERMINAL with two antennae of opposite circular polarisations, enabling the two circular components transmitted by satellite SAT to be received. The two components are noted thus: left-handed circular component LHCP and right-handed circular component RHCP.

Figure 2:
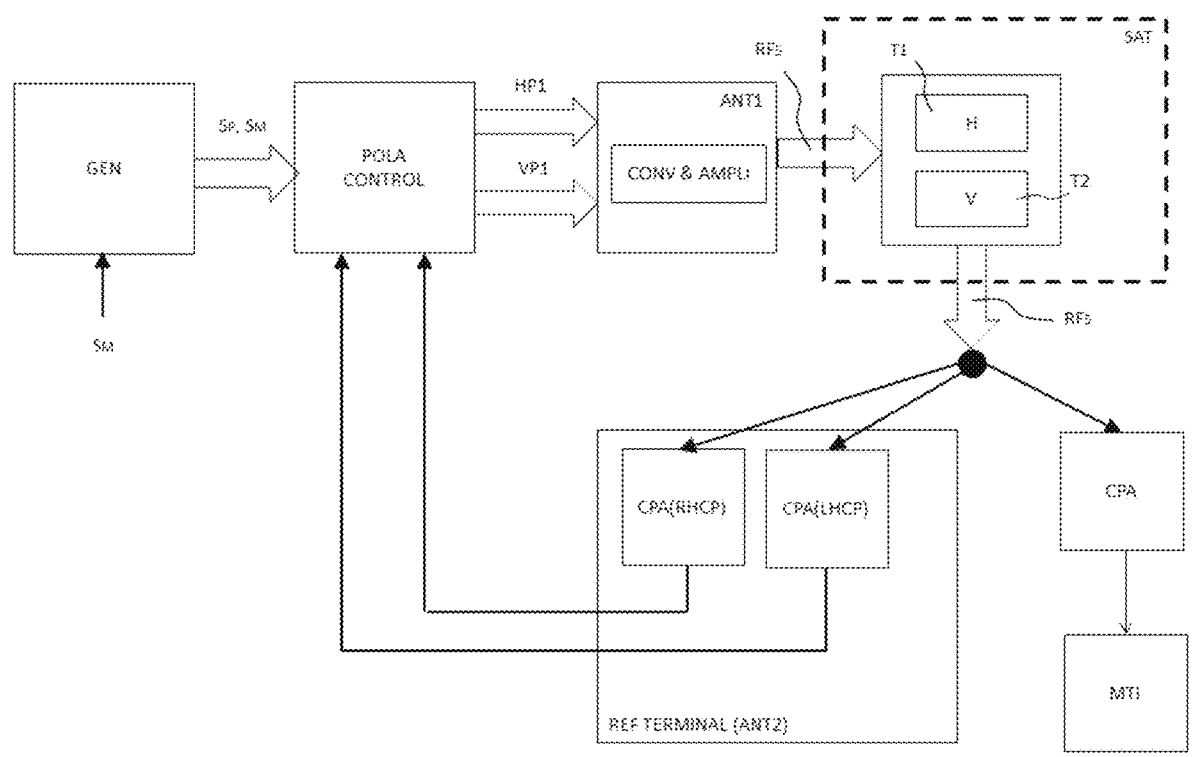
FIG. 2: a functional diagram of the functions to be implemented to embody the invention.

The signals transmitted by an antenna ANT1 or the satellite's antenna are noted RFs in FIG. 2.

The two circular components received by reference terminal REF TERMINAL are processed and transmitted to polarisation controller POLA CONTROL so as to determine at least one physical parameter causing an alteration of at least one circular polarisation of the received components. The alterations of the polarisations of the signals output from satellite SAT are caused by the transponders in particular due to:

- the white noise introduced by each transponder;
- the phase noise which is specific to the frequency bands of each transponder;
- relative errors between transponders introducing a phase, amplitude or frequency shift between the components of two transponders;
- non-linearity effects of the amplifiers and filters of each transponder.

The physical parameters which are determined at reception can be used to calculate corrective parameters so as to correct the linear components HP1, VP1 transmitted to satellite SAT.

By this means the system of the invention forms a looped and controlled system enabling the linear components transmitted by first ground station ANT1 to be corrected using corrective parameters.

If REF TERMINAL and POLA CONTROL are not located in the same site, for example when the upstream coverage of the satellite is different from the downstream coverage, a means of communication between REF TERMINAL and POLA CONTROL is necessary. To reduce the quantity of data transmitted, a proportion of the production of the signals received by REF TERMINAL can be performed by REF TERMINAL itself, so as to transmit to POLA CONTROL only the results of the measurements and not all the received signals.

The REF TERMINAL and the POLA CONTROL can be located in the same site so as to simplify the procedure for processing the received signals and the analysis of the physical parameters which will lead to the determination of corrective parameters. This is possible when the station is located in a common region between the upstream cover and the downstream cover of the satellite.

Physical Parameters

According to one embodiment, satellite SAT transmits a circular component produced from two corrected linear components passing through two transponders.

According to a first embodiment, a single reception antenna is used, ANT2, the polarisation direction of which is suitable for the direction generated by the combination of two linear polarisations at output from satellite SAT.

According to a second embodiment, with ground reception, two antennae ANT2_L and ANT2_R, circularly polarised with opposite polarisation directions, enable a first circular component to be received, for example left-hand LHCP1, and a second circular component to be received, for example right-hand RHCP1.

On reception at least one circular polarisation antenna ANT2 receives the circularly polarised signals. The received signals are processed locally, or transmitted to polarisation controller POLA CONTROL in order to deduce from them physical parameters of the signals received representing differences between two linear polarisations forming the circular polarisation. A power measurement of the received signals, a spectrum analysis and a cross-polarisation measurement can be made to deduce physical parameters such as frequency, phase and amplitude shifts of the two linear components forming the signal received by circularly polarised antennae.

The measured physical parameters therefore correspond to parameters of each linear polarisation component expressed in terms of phase, frequency or amplitude which cause a deformation of the received circular polarisation, which is assumed to be perfect. To make these measurements one of the two linear polarisations can be chosen as a reference.

According to one embodiment, polarisation controller POLA CONTROL is able to deduce linear components H and V from circular polarisation components LHCP1 and RHCP1 received by at least one antenna ANT2.

One advantage of the use of two antennae ANT2_L and ANT2_R, which are circularly polarised in opposite directions, i.e. a right-hand circular polarisation and left-hand circular polarisation, derives from the fact that received main signal $S_M$ is received at one of the circular polarisations, and that the measurement of the power of signals received with the opposite polarisation, which in principle should be zero, enables a part of the losses relating to cross-polarisation phenomena to be deduced easily.

Polarisation controller POLA CONTROL is then able to extract from the two circular components at least one quantitative and/or qualitative physical parameter responsible for altering the circular polarisation of the received signals when the polarisation is present.

The physical parameters can therefore be deduced by a measurement of the spectrum in order to derive a frequency drift, measurements of the power levels of the received signals, or alternatively phase variations of the received signals for each of the circular polarisations so as to deduce from them corrective parameters of linear components HP1 and VP1 which are to be transmitted to satellite SAT.

The physical parameters can be deduced from the analysis of main signal $S_M$ received for each of the circular components. In addition, the physical parameters can be deduced from the analysis of the pilot signals for each of the received circular components when the latter are used.

The physical parameters can also be deduced simply from a comparison of parameters of transmitted linear components and the received corresponding components.

There is therefore a first analysis called a "relative" analysis between the two components relative to each other, and a second analysis called a "comparative" analysis between the transmitted and received components. These two analyses enable physical parameters to be deduced, and therefore corrective parameters. These two analyses can be combined or undertaken independently of each other so as to determine corrective parameters.

Corrective Parameters

Polarisation controller POLA CONTROL is able to deduce corrective parameters to be applied to each linear component to be transmitted according to the physical parameters deduced from the signals received by the return link enabling the method of the invention to be implemented. The return link enables a looped system to be formed between a first ground station ANT1, satellite SAT and a second ground station ANT2. Second ground station ANT2 is a form of "control" receiver which allows control of the linear components to be transmitted in order that a set of users MT1, MT2, including circularly polarised antennae, is able to receive optimally main signal $S_M$ transmitted by satellite SAT.

When the two antennae ANT1 and ANT2 are distant, and when a wire or satellite transmission is required, to transmit the signals received to polarisation controller POLA CONTROL, a correction of the propagation time can be generated by polarisation controller POLA CONTROL to the received signals. Alternatively, the signals received by ANT2 are analysed locally and the results of the analysis sent to POLA CONTROL.

The estimate of the frequency drift can be calculated for polarisation controller POLA CONTROL from an estimator. For example, a Mengali-Morelli algorithm can be used for this purpose. A linear polarisation is chosen as the reference, for example the vertical polarisation. The frequency drift is deduced by comparing the two linear components.

A frequency correction can be introduced in the component which is shifted relative to the reference. An opposite shift can also be introduced in the reference component. The corrective factor can also be shared across both components.

The estimate of the phase variation between the two components can also be calculated from polarisation controller POLA CONTROL. A linear component is then chosen as the reference, for example the vertical component.

The phase variation can be calculated between the two linear components using a relative analysis. A phase variation between each linear component received can be calculated with the previously transmitted recorded components.

This double comparison enables the relative differences between one transponder and the other to be measured, and the absolute differences of a looped system between transmitted and received components to be measured.

A phase correction can be introduced in the component which is shifted relative to the reference. An opposite shift can also be introduced in the reference component. The corrective factor can also be shared across both components.

The relative amplitude variation between two components can be measured by an estimator. According to one embodiment, the estimator can be based on levels of power received from each component.

A correction can then be applied when transmitting linear components HP1 and VP1, taking into consideration the amplitude difference of the two components deduced from the circular components received by second ground station ANT2. The amplifier present either in the polarisation controller, or in a component located before antenna ANT1, or in antenna ANT1, can be controlled so as to amplify one of the linear components with the corrective parameter.

In another embodiment, the amplification can be configured using a digital coefficient applied to the digital sequence of the signal which is translated to the digital/analog converter, also called the DAC.

According to one embodiment, each component is amplified taking into consideration a part of the compensation to be applied to amplitude.

Multi-Spectra Compensation in a Transponder

When main signal $S_M$, in an upstream or downstream band of the transponder includes different carriers or when the spectrum of the signal is present in different sub-bands of a given transponder, such as the sub-bands represented as C1 and C2 of transponder T1 in FIG. 4, a correction can then be applied to compensate for the effects of a first sub-spectrum SPC1 on a second sub-spectrum SPC2, and vice versa.

To do so, a measurement of the influence, for example, of the horizontal component in band C2 on the horizontal component transmitted in band C1, can be evaluated by polarisation controller POLA CONTROL.

The expressions "influence on a linear component" and "influence on a signal" are used interchangeably in the description.

A first phase/amplitude influence can be estimated, i.e. the influence of the amplitude of the signal transmitted in band C2 on a phase variation of the signal transmitted in band C1. This influence can be compensated by the polarisation controller after the evaluation of the physical parameters of the signals received by second ground station ANT2.

A second amplitude/amplitude influence can be estimated, i.e. the influence of the amplitude of the signal transmitted in band C2 on the amplitude of the signal transmitted in band C1. This influence can be compensated by the polarisation controller after the evaluation of the physical parameters of the signals received by second ground station ANT2.

Typically, the method of the invention enables consideration to be taken of the influence of a pilot signal $S_{P1}$ transmitted in band C1 on a signal SPC2($S_{M1}$) transmitted in band C2, at least of the linear component in question.

Reciprocally, the influence of a signal SPC1($S_{M1}$) transmitted in sub-band C2 on a pilot signal $S_{P1}$ transmitted in band C1 can be measured.

The method of the invention applies when the two sub-spectra SPC1 and SPC2 are not processed by the same operators, or by the same antennae ANT1 of a given ground station. When signals SPC1, SPC2 originate from different operators in a linearly polarised transponder, the two signals can be self-generated from the phase or amplitude differences which must be corrected. The method of the invention enables such corrections to be made.

The polarisation controller can control and detect, in real time, the presence of a signal with a spectrum SPC2, and apply corrective factors to the components of a signal with a spectrum SPC1.

When polarisation controller POLA CONTROL controls the signals of both spectra SPC1 and SPC2, the corrective parameters can be applied to each vertical or horizontal component transmitted in a given transponder T1.

According to one example embodiment in which the method of the invention enables a pilot signal $S_{P1}$ to be generated in a band C1 of a transponder T1, the amplitude and the phase of this pilot signal $S_{P1}$ can be followed so as to take into consideration the effects caused by the presence of signals in band C2 of this same transponder.

The invention claimed is:

1. A method for generating a signal with a second type of polarization from at least two transponders of a satellite adapted to process signals polarized with a first type of polarization, the method comprising:
    transmitting by a ground transmitter of at least two components of signals polarized with the first type of polarization, and phase-shifted so as to produce a signal polarized with the second type of polarization by the at least two transponders of the satellite, wherein the at least two transponders have channels with frequencies, said channels sharing at least one common spectral band including at least a portion of a spectrum of the transmitted signals;
    processing the signals by the at least two transponders of the satellite, wherein the components of the signals are combined after their transmission by the satellite to form a signal with a polarization of the second type;
    receiving by a reference ground terminal having at least one antenna polarized with the first or second type of polarization, so as to receive the signals transmitted by the satellite;
    measuring at least one physical parameter from the received signals, and determining a correction parameter to be applied to the generation of the components of signals polarized with the first type of polarization;
    generating a phase compensation or an amplitude compensation or a frequency compensation, or any combination of the phase compensation, the amplitude compensation and the frequency compensation, of the components of the signals polarized with the first type of polarization transmitted by the ground transmitter, wherein the compensation is generated by a polarization controller so as to form a looped system between the ground transmitter and the satellite, and to provide polarization of the second type by the components being combined after their transmission by the satellite.

2. The method according to claim 1, wherein the first type of polarization is a linear polarization, and the second type of polarization is a circular polarization.

3. The method according to claim 2, wherein the polarization controller generates two orthogonal linear components from a main signal received at an input of the polarization controller, wherein a first component of the two orthogonal linear components generates a horizontal polarization component from the main signal, and a second component of the two orthogonal linear components generates a vertical polarization component from the main signal, and wherein at least one linear polarization component of the two orthogonal linear components is compensated in terms of amplitude or phase or frequency, or any combination of the amplitude, the phase and the frequency.

4. The method according to claim 2, wherein the polarization controller generates two linear components from two main signals received at an input of the polarization controller, wherein a first signal has, at output from the satellite, a left-handed circular polarization, and a second signal has, at output from the satellite SAT, a right-handed circular polarization, wherein the polarization controller generates a component of a horizontal polarization signal and a component of a vertical polarization signal from the two main signals at the inputs, and wherein at least one linear polarization component is compensated in terms of amplitude or phase or frequency, or any combination of the amplitude, the phase and the frequency.

5. The method according to claim 2, wherein the processing of the signals by the at least two transponders includes an application of a coefficient of amplification and a filtering template to each linearly polarized component of a common band of two transponders so as to produce signals including a circular polarization in a given direction at an output of the antenna.

6. The method according to claim 2, wherein a measurement of a physical parameter includes a measurement of the cross-polarization between the two components of the signals received by means of the polarization controller, wherein the correction parameter is automatically calculated to be applied to the generation of the linearly polarized signals transmitted to the satellite.

7. The method according to claim 2, wherein a measurement of a physical parameter includes a measurement of a difference of group propagation times of each of the polarization components of the received signals.

8. The method according to claim 2, wherein a measurement of a physical parameter includes a measurement of an influence in terms of amplitude or phase, or both amplitude and phase, of a spectrum of a signal transmitted in a transponder outside the common band of two transponders in a linear component of a pilot signal transmitted in the common band of the two transponders.

9. The method according to claim 8, wherein the determination of the correction parameter includes an evaluation of a first phase variation parameter, or of a second amplitude variation parameter, or of a third frequency variation parameter, or any combination of the first phase variation parameter, the second phase variation parameter and the third phase variation parameter, of the signals received by the reference ground terminal between the at least two transponders, deduced from the measurement of the at least one physical parameter.

10. The method according to claim 8, wherein the measurements of at least one received parameter are made from the reception of at least one component of a pilot signal.

11. The method according to claim 8, wherein the measurements of at least one received parameter are made from the received signals including at least the components of the main signal.

12. The method according to claim 2, wherein a calculator of the polarization controller makes a comparison between each linear polarization component of the main signal transmitted to the satellite with the respective linear components deduced from the circular components received by the reference ground terminal, wherein the transmitted linear polarization components of the main signal are recorded in a memory of the polarization controller.

13. The method according to claim 2, wherein the reference ground terminal and the polarization controller are:
either both sited in a same geographical location;
or sited in two different positions, with the measurements or analyses, or both the measurements and the analyses, made by the reference ground terminal then being sent to the polarization controller by a communication system.

14. The method according to claim 13, wherein when the reference ground terminal and the polarization controller are sited in two different positions, a phase compensation value is calculated taking into account the radiation diagram of the satellite's transmission antenna so as to generate, from the parameters of the signals received by the reference ground terminal, the compensations to be made to the signals transmitted to the satellite to optimise the circular polarization quality in a region where the terminals are located.

15. The method according to claim 14, wherein the polarization controller includes a reference terminal.

16. The method according to claim 1, wherein the first type of polarization is a circular polarization, and the second type of polarization is a linear polarization.

17. The method according to claim 1, wherein two sets of transponders are each associated with a linear polarization, wherein a polarization of a transponder of a first set of the two sets of transponders is orthogonal to the linear polarization of a transponder of the second set of the two sets of transponders, and wherein each transponder of the first set shares at least one common spectral band with a transponder of the second set.

18. The method according to claim 17, wherein both linear components transmitted by the ground transmitter each include at least one frequency spectrum in the spectral band common to at least two transponders of the satellite.

19. The method according to claim 7, wherein at least one first transponder of the first set shares at least one common spectral band with two other transponders of the second set, wherein the two other transponders have a polarization orthogonal to the first transponder, and wherein the common spectral band includes two spectral sub-bands.

20. The method according to claim 19, wherein the generating of a phase compensation or an amplitude compensation or a frequency compensation, or any combination of the phase compensation, the amplitude compensation and the frequency compensation, of the linearly polarized signals by the polarization controller is configured so as to reduce the effects on at least one linear component, wherein the effects are related to the presence of at least one spectrum of a signal transmitted by the first transponder in a band outside the common band of two transponders, in which common band the at least one linear component is transmitted.

21. The method according to claim 20, wherein the reduction of influence is calibrated to obtain a circular polarization formed by two linear polarizations of components sharing a common band of two transponders, respectively of the first and of the second set of transponders.

22. The method according to claim 19, wherein when at least one transponder of the first set shares at least one common spectral band with two transponders of the second set, wherein the common spectral band includes two spectral sub-bands, the polarization controller includes a configuration of the operational transponders of the satellite, such that there is a simulation of interactions of at least one component of a signal received in a sub-band of a transponder in a component of a signal received in another sub-band of the same transponder common to another transponder to generate a correction parameter to be applied to the linear component of the signal transmitted in the common band.

23. The method according to claim 22, wherein the interactions include the influence of a signal of a sub-band on the power level of another signal transmitted in another sub-band in the same transponder.

24. The method according to claim 22, wherein the interactions include the influence of a signal of a sub-band on the phase of another signal transmitted in another sub-band in the same transponder.

25. The method according to claim 17, further comprising filtering each linearly polarized component in common portions of spectra shared between, respectively, two transponders of each of the two sets of transponders.

26. The method according to claim 1, wherein a pilot signal is transmitted by the ground transmitter, wherein the pilot signal includes at least one linear polarization component forming either a continuous wave, or a spread spectrum sequence.

27. The method according to claim 26, wherein the pilot signal includes two linear polarization components, wherein both linearly polarized components are transmitted in the common spectrum of two transponders belonging respectively to each of the two sets of transponders.

28. The method according to claim 26, wherein a linear polarization component of the pilot signal is transmitted in a band of frequencies of a transponder of the first set of transponders not shared with a frequency band of a transponder of the second set of transponders.

29. A device for correcting a polarization of components of signals, the device comprising a polarization controller including a receiver module, a calculation system and a memory to apply corrective parameters to linear or circular signal components, wherein the corrective parameters are estimated to mitigate processing of the signals passing through at least two transponders of a satellite, wherein the applied corrections enable a signal to be generated with circular or linear polarization when the signals are combined at the output of the transponders, wherein the receiver module is configured to receive signals received by a ground terminal from the satellite, and wherein the calculation system is configured to:
measure at least one physical parameter from the received signals, and to determine a correction parameter to be applied to the generation of components of signals polarized with a first type of polarization, and
generate a phase compensation or an amplitude compensation or a frequency compensation, or any combination of the phase compensation, the amplitude compensation and the frequency compensation, of the components of the signals polarized with the first type of polarization transmitted by a ground transmitter to the satellite, wherein the compensation is generated so as to form a looped system between the ground transmitter and the satellite, and to provide polarization of a second type by the components being combined after their transmission by the satellite.

* * * * *